United States Patent [19]

Pagdin et al.

[11] 3,869,013
[45] Mar. 4, 1975

[54] FOUR-WHEEL-DRIVE VEHICLES
[75] Inventors: Brian Colin Pagdin, Sutton Coldfield; Oswald Webb, Coventry, both of England
[73] Assignee: GKN Transmissions Limited, Birmingham, England
[22] Filed: Feb. 15, 1973
[21] Appl. No.: 332,765

[30] Foreign Application Priority Data
Feb. 15, 1972  Great Britain...................... 6857/72

[52] U.S. Cl..................... 180/44 R, 180/49, 192/61
[51] Int. Cl...................... B60k 17/34, B60k 17/30
[58] Field of Search ....... 180/44 R, 44 M, 70 R, 49, 180/23; 418/165; 192/60, 61

[56]     References Cited
           UNITED STATES PATENTS
1,273,519   7/1918   Millington.......................... 180/44 R
2,382,114   8/1945   Stephens............................. 192/61
2,435,244   2/1948   Stephens........................... 192/61 X
2,802,554   8/1957   Pringle.......................... 180/44 R X
2,811,233  10/1957   Hindmarch.......................... 192/61
3,300,002   1/1967   Roper ............................. 180/44 R
3,378,093   4/1968   Hill ............................... 180/44 R
3,495,477   2/1970   Mueller........................... 192/60 X
3,577,803   5/1971   Mueller........................... 192/60 X

*Primary Examiner*—David Schonberg
*Assistant Examiner*—John P. Silverstrim
*Attorney, Agent, or Firm*—Spencer & Kaye

[57]          ABSTRACT

The specification discloses a four-wheel-drive vehicle in which the rear axle is connected directly to the prime mover through a change speed means and the front axle is connected to the prime mover by a pump arranged to pump liquid around a circuit having variable orifice means, the effective size of such means reducing automatically with increase in speed difference between the front and rear wheels.

8 Claims, 7 Drawing Figures

FOUR-WHEEL-DRIVE VEHICLES

BACKGROUND OF THE INVENTION

1. Field of the Invention

This invention relates to four-wheel drive vehicles and in particular to drive arrangements therefor.

2. Description of the Prior Art

Heretofore it has been proposed to provide in such a vehicle a direct drive from the vehicleprime mover through a change speed mechanism to the rear axle and to drive the front axle when necessary through a pump, the parts of which are connected to the prime mover and the front axle respectively. In this proposal the pump disclosed is a piston-type of pump and with this type of pump it is difficult to obtain smooth transfer of torque to the front axle.

Moreover, in the prior proposal, the resistance against which the fluid is pumped by the pump is fixed during operation thereof so that high torque transmission via the pump will be accompanied by high speed differences between the pump parts and therefore a considerable loss of energy by heat and fluid friction.

It is an object of the invention to provide an improved drive arrangement for a four-wheel-drive vehicle, in which a pump is used to apportion the prime mover torque between the axles.

SUMMARY OF THE INVENTION

According to the invention we provide a four-wheel-drive vehicle comprising driveable front and rear sets of wheels, the wheels of at least one set being connected by a differential gear; a prime mover, change speed means having an input and an output, the input being arranged to be driven by the prime mover and the output being connected by a first driving connection to drive the wheels of said one set; a two-part second driving connection between the wheels of said other set and either the first driving connection or said output, the parts of said second driving connection being drivingly connected respectively to the wheels of said other set and said output or first connection; a gear pumping device comprising first and second meshing gear means connected respectively to said parts of the second driving connection, relative rotation of said gear means causing pumping of non-gaseous fluid; a circuit for the pumped fluid; and variable orifice means in the circuit and operable by the pressure of the fluid being pumped to increase the resistance encountered by fluid being pumped around the circuit with increase in the speed of relative rotation between the first and second gear means.

By automatically increasing the pumping resistance with increase in speed difference between the front and rear wheels, i.e., with increase in torque transmitted through the pumping device, increased torque can be transmitted at lesser speed differences between the front and rear wheels than if no increase of resistance were provided; and thus the heat generated in the pump and the horse power absorbed thereby is limited without unduly limiting the torque transmitted. There may in addition be provided driver-controlled means for varying the pumping resistance.

Preferably said first gear means comprises a first gear rotatable about an axis and to which one part of said second driving connection is connected and said second gear means comprises second gears meshing with the first gear and mounted on a carrier which itself rotates about said axis and to which the other part of said second driving connection is connected, relative rotation of the first gear and the carrier causing said non-gaseous fluid to be pumped by said gears.

The circuit may include two variable orifice means, one operable during forward movement of the vehicle and the other operable during reverse movement and each arranged to increase the resistance encountered by fluid being pumped around the circuit with increase in the speed of relative rotation, between the first gear and the carrier.

By an arrangement embodying the invention it is simple to provide a dominant drive characteristic. It is preferred in a four-wheel-drive vehicle that the handling characteristics of the vehicle shall include the best features of both front-wheel-drive vehicles and rear-wheel drive vehicles but that one of these sets of features should predominate so that the driver can anticipate the handling characteristics of the vehicle. The dominant characteristics in a vehicle embodying the invention will be the characteristic of a vehicle having drive to the wheels which are connected by the first driving connection to the change speed means. The characteristic may either be that of a front wheel drive vehicle or a rear wheel drive vehicle but will normally be the latter.

The gear-pumping device will be arranged so that there will be no drive between the parts of the second driving connection until there is a predetermined speed difference between the front and rear wheels of the vehicle. If, for example, the dominant characteristic of the vehicle is that of a rear-wheel-drive vehicle and the rear wheels should spin without the front wheels spinning, there will be a speed difference between the front and the rear wheels, the elements of the pumping device will be relatively rotated and there will be a driving connection to the front wheels, and consequent transfer of a proportion of the torque previously applied to the rear axle to the front axle thus to terminate the rear wheels spinning.

The wheels of said other set may be connected by a differential gear, alternatively, each wheel, or group of wheels if there are more than two, may be connected to the first driving connection or the output through a separate pumping device. Thus there may be two separate second driving connections from the output or first driving connection to each wheel or group of wheels of said other set or the two pumping devices may be driven from a common part of the second driving connection. In either arrangement there is a fluid connection between the two pumping devices to equalise the pressure therein and thus provide in effect a differential connection between the wheels, or groups of wheels, of the set.

Blow-off valve means may be provided to limit the pressure developed in the or each pumping device to safe limits but if the drive is designed so that the maximum torque transmitted is equivalent to the maximum permitted pressure such blow-off valve means can be dispensed with.

If desired, an anti-skid braking sensor may be connected to the second driving connection and used to control the vehicle brakes in a known manner to obviate skidding of the vehicle.

BRIEF DECSCRIPTION OF THE DRAWINGS

Various embodiments of the invention will now be described in detail by way of example with reference to the accompanying drawings in which.

DESCRIPTION OF THE PREFERRED EMBODIMENTS

Figure 1:
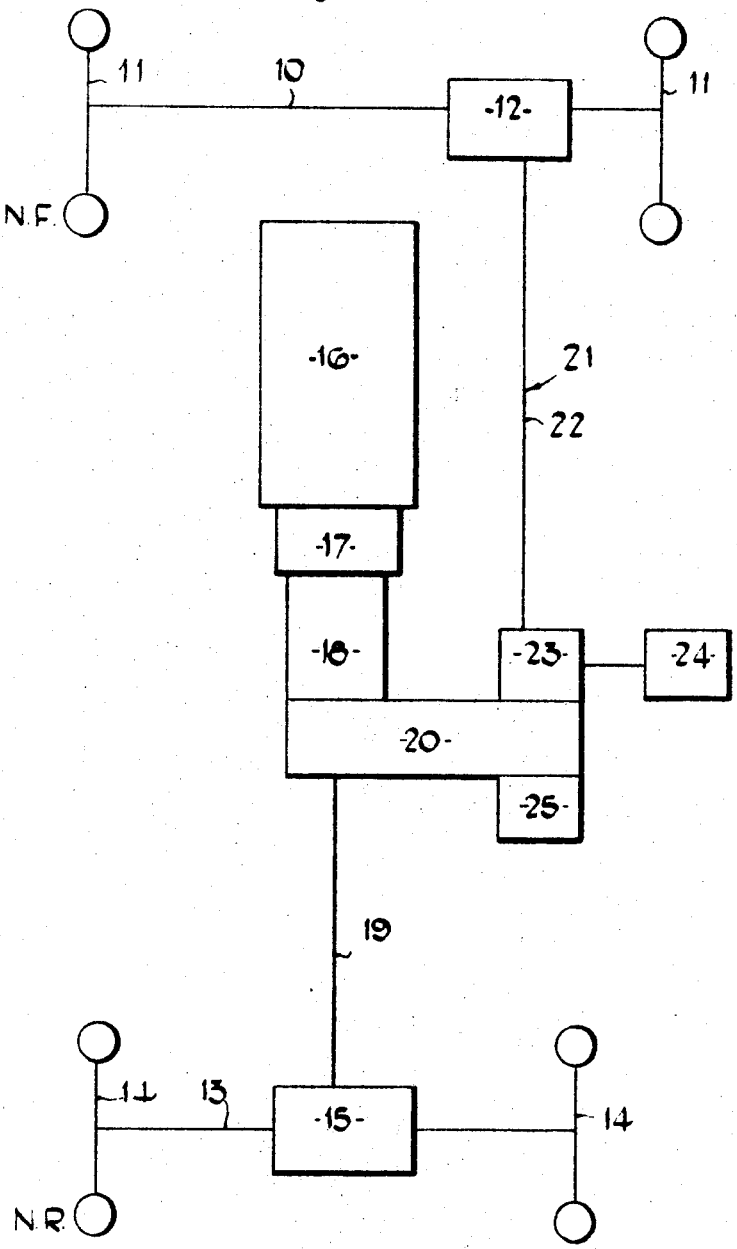
FIG. 1 is a diagram illustrating a first form of drive embodying the invention.

Referring now to FIG. 1 in a first embodiment of the invention a four-wheel-drive vehicle has a front axle 10 carrying drivable wheels 11 and having an inter-wheel differential gear 12. The vehicle has a rear axle 13 having drivable wheels 14 and an inter-wheel differential gear 15. The vehicle has a prime mover 16 which drives, through a disengageable clutch 17, a change-speed means or gear box 18. The gear box has an input which is connectable to the prime mover 16 through the clutch 17 and an output which drives a first drive connection 19 which is interposed between the gear box 18 and the inter-wheel differential gear 15. A transfer gear box 20 transmits drive from the first driving connection to a second driving connection indicated generally at 21 and which is connected to the differential gear 12 of the front axle 10. The second drive connection comprises two parts, one of which is indicated at 22 and is connected to one element of a pumping device 23. The other element of the pumping device is connected by the transfer gear box 20 to the first driving connection 19. The pumping device is so arranged that when there is relative rotation between the parts of the second drive connection 21 there is relative rotation between elements of the pumping device which causes non-gaseous fluid to be pumped around a circuit whose resistance can be varied by variable orifice means 24 which is operated automatically as described below.

An anti-skid braking sensor 25 is connected to the second drive connection 21.

Under normal conditions, with no more than normal slip between the wheels 11 and 14 and the road surface the vehicle is driven solely by the rear wheels 14 through the first drive connection 19. The transfer gear box 20 will be arranged such that the elements of the pumping device 23 will be rotating at substantially the same speed (or appropriate speeds) so that little or no fluid will be pumped. If, for example, the rear wheels 14 start to spin relative to the front wheels 11 then there will be relative rotation between the elements of the pumping device 23 and fluid will be pumped by the device through the variable orifice means 24 which will exert a resistance against the pumping of the fluid. The resultant reaction will cause a drive to take place between the elements of the pumping device and therefore some of the torque previously applied to the rear wheels will be applied to the part 22 of the second driving connection 21 and the front wheels 11 will be driven. The torque redirected to the front wheels 11 from the rear wheels 14 will reduce the torque applied to the latter and thus prevent spinning of the rear wheels 14.

Figure 2:
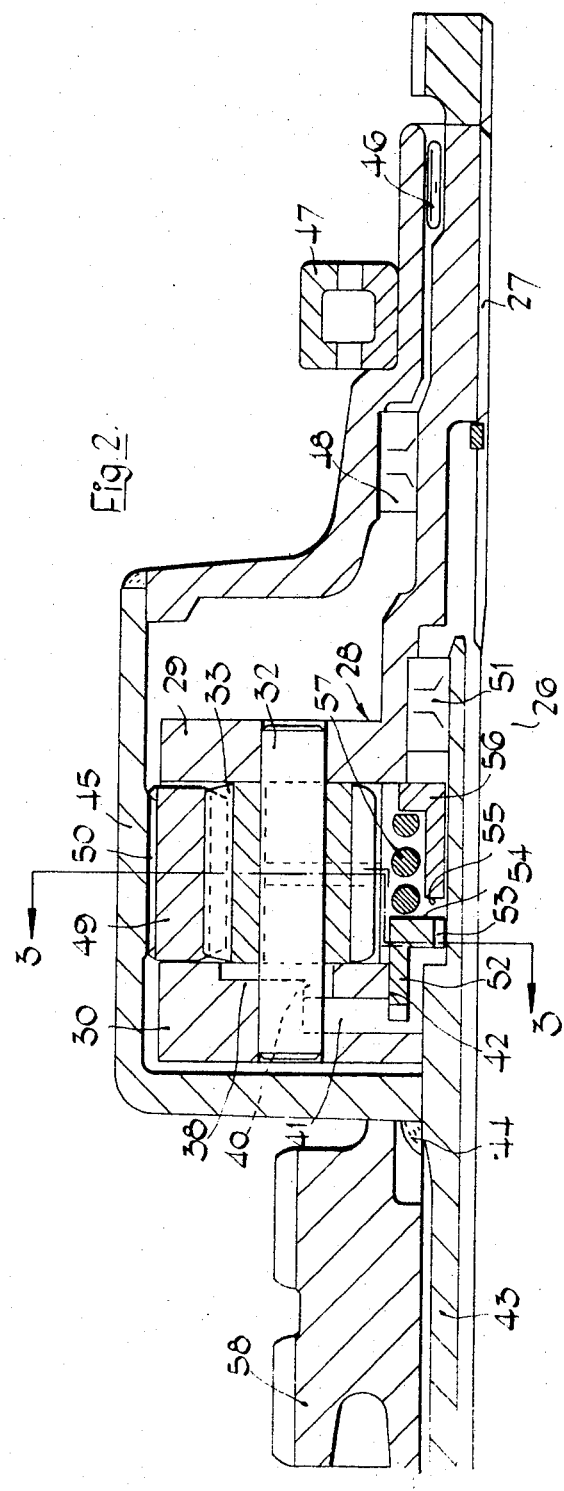
FIG. 2 is a detail longitudinal half-section of one form of pump which can be used in the invention.
Figure 3:
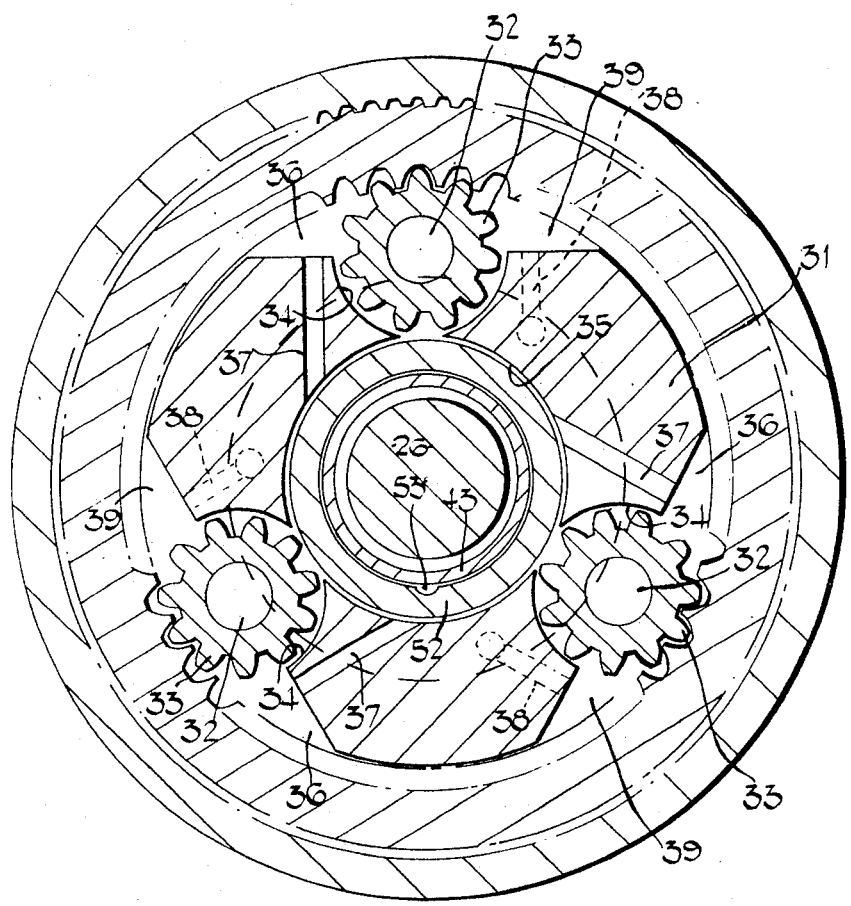
FIG. 3 is a section on the line 3—3 of FIG. 2.

Referring now to FIGS. 2 and 3, these show one form of pump which may be used and which incorporates variable orifice means for automatically increasing the pumping resistance with increase in relative speed between the parts of the connection 21.

Referring to these figures, the pump is of a planetary type and comprises an input shaft 26 which is splined at 27 to a planet carrier indicated generally at 28. The planet carrier has end plates 29 and 30 between which is a central body 31. Between the plates 29 and 30 extend pins 32 on which are mounted planet gears 33. There are three such pins and gears and each gear is mounted in a pocket 34 in the body 31. The body has a central bore 35 and extending between the bore 35 and lateral extensions 36 of the pockets 33 are passages 37. The end plate 30 is provided with three slots 38 which communicate with further lateral extensions 39 of the pockets 34 and through holes 40 with an annular groove 41 in the plate. The latter has an annular recess 42 at its inner periphery which communicates with the groove 41.

An output shaft is indicated at 43 and has welded thereto at 44 a housing 45 within which the planet carrier is mounted. The right hand end of the housing is mounted in bearings 46 and 47, the former being between the housing 45 and the planet carrier 28. A fluid seal 48 is also provided between the housing and the planet carrier. The housing carries an annulus gear 49 which is splined thereto at 50 and which extends between the end plates 29 and 30 with small clearance. It will be appreciated that as relative rotation takes place between the input and output shafts 26 and 43 respectively the planet gears will be caused to rotate.

A fluid seal 51 is provided between the planet carrier 28 and the output shaft 43 and a valve member, indicated generally at 52 and which is in the form of an annulus of L section, is mounted in the annular recess 42 in the end plate 30 and in the bore 35 of the body 31. The flange of the valve member 52 is provided with a channel 53 to permit the flow of fluid between the groove 41 and the bore 35. The right hand face 54 in FIG. 2 of the valve member 52 is arranged to cooperate with the left hand face 55 of an L-shaped annular abutment 56. A spring 57 is interposed between the abutment 56 and the valve member 52 and urges the latter to the left in FIG. 2.

During operation of the pump during forward movement of the vehicle i.e. upon relative rotation between the shafts 26 and 43, fluid contained in the housing 45 is pumped by the planet gears 33, which rotate counter clockwise as the planet carrier 28 rotates clockwise, from the bore 35, along the passages 37, through the extensions 36, around the pockets 34, through the extensions 39, slots 38 and holes 40 to the groove 41 through the channel 53 and between the faces 54 and 55 to the bore 35. It will thus be seen that the fluid is circulated through orifice means constituted by the gap between the faces 53 and 54 which are urged apart by the spring 57. The pumping resistance of the fluid circuit is arranged to be controlled by the spacing between the faces 54 and 55. As the speed difference between the shafts 26 and 43 increases the flow of pumped fluid will increase and thus the pressure in the groove 41 will increase and will tend to move the valve member 52 to the right in FIG. 2 thus decreasing the clearance between the faces 54 and 55 and thus increasing the resistance to pumping. It will be seen, therefore, that with an increase in speed difference and therefore with an increase in the torque transmitted by the pump the pumping resistance increases and this enables an increase in torque to be transmitted while controlling the speed difference as will be described below.

In the embodiment of FIG. 1, the input shaft 26 is connected to the transfer gear box 20 and the output shaft 43 is connected, for example by means of chains engaged around a sprocket 58 on the shafts 43, with the part 22.

Figure 4:
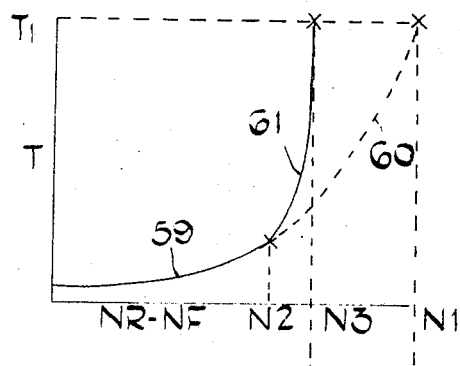
FIG. 4 is a graph illustrating the torque transmitted by the pump as related to the speed difference between the front and rear wheels and how this torque is modified by increasing the pumping resistance with increase in relative speed between the front and rear wheels.

Referring now to FIG. 4, this is a graph of the torque transmitted by the pump against the difference in speed between the rear wheels $N_R$ and the speed of the front wheels $N_F$. If means were not provided for increasing the pumping resistance i.e., if the valve member 52 were not provided, then the relation between the torque and the speed difference would follow a curve having the lower part 59 and the upper part as shown in dotted line at 60. It will be seen therefore that for an amount of torque $T_1$ to be transmitted there would have to be a speed difference between the rear and front wheels of $N_1$. However, by commencing to increase the pumping resistance at a predetermined speed difference indicated at $N_2$ the torque transmitted for a given speed difference can be increased as shown by the part of the curve 61, whereby the torque $T_1$ can be transmitted at a speed difference $N_3$ considerably lower than $N_1$.

Figure 5:
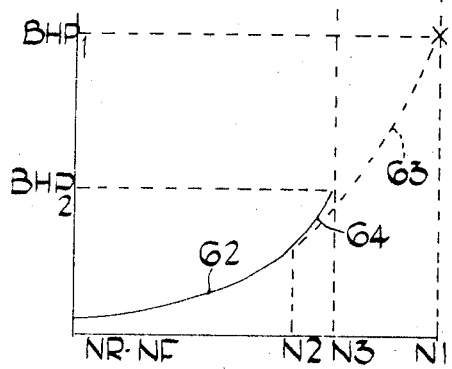
FIG. 5 is a graph similar to FIG. 4 but showing the horse power dissipated in the pump.

Referring to FIG. 5, this shows the brake-horsepower dissipated in the pumping device as a function of the speed difference between the parts thereof, i.e., between the rear and front wheels. It will be seen that at a speed difference of $N_1$, the brake-horsepower dissipated is at a high level indicated by BHP. However, when the torque-speed curve is as indicated at 61 in FIG. 4, the brake-horsepower dissipated at a torque $T_1$ and at the speed $N_3$ is as indicated at $BHP_2$ and is at a considerably lower value than $BHP_1$ and therefore the cooling problem associated with the pumping device are very much reduced as compared with what they would be if the automatic increase in pumping resistance were not provided. Thus referring to FIG. 5, the curve of BHP dissipated would, in the absence of the increase in the pumping resistance, follow the curve having the parts 62 and 63 whereas by introducing the increase in pumping resistance the curve comprises the parts 62 and 64. It will be appreciated that there will be a gradual increase in the resistance to pumping as the valve member 52 moves to the right in FIG. 2 against the action of the spring 57 but that this increase in pumping resistance will commence at the speed difference $N_2$.

Figure 6:
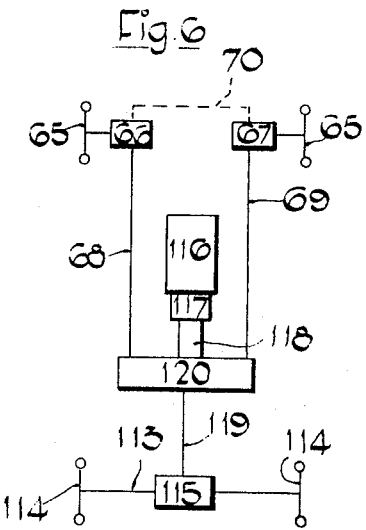
FIGS. 6 and 7 are diagrams similar to FIG. 1 of further embodiments of the invention.
Figure 7:
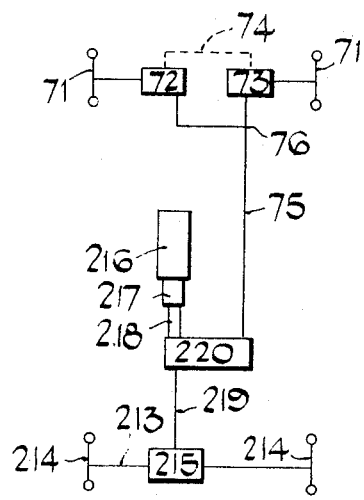

In FIG. 1, we have shown an arrangement in which there is an inter-wheel differential gear between the wheels of the front axle and an inter-wheel differential gear between the wheels of the rear axle. The dominant drive characteristics of this arrangement will be therefore those of a rear-wheel drive vehicle since the rear wheels are connected directly by the first drive connection 19. FIGS. 6 and 7 show alternative arrangements in which the dominant characteristics of the vehicles illustrated are also those of a rear-wheel drive vehicle and the engine, clutch, change speed means, transfer gear box, first connection and rear axle arrangement are as in FIG. 1 and are indicated in FIG. 6 by the same reference numerals with the prefix 1 and in FIG. 7 by the same reference numerals with the prefix 2. In each of the embodiments shown in FIGS. 6 and 7, however, each of the front wheels is driven via a separate pumping device, for example a pumping device of the type described in relation to FIGS. 2 and 3.

Thus referring first to FIG. 6, each of the front wheels 65 is driven by separate pumping device, the devices being indicated at 66 and 67. The device 66 has a drive 68 to the transfer gear box 120 and the device 67 has a drive 69 to the transfer box 120. The method of operation of the systems is substantially as described in FIG. 1 but there is a fluid interconnection indicated by the dotted line 70 between the devices 66 and 67 to equalise the pressure in the devices and therefore, as it were, provide a differential connection between the wheels 65. It will be appreciated that under normal circumstances substantially all the torque will pass along the first drive connection 119 to the rear wheels 114 but where there is a substantial speed difference between the rear wheels 114 and the front wheels 65 then the devices 66 and 67 will operate to re-allocate some of the torque previously supplied to the rear wheels to the front wheels. There will of course be means to increase the pumping resistence with increase in speed difference between the front and rear wheels as described in relation to FIGS. 1 to 3.

FIG. 7 shows an arrangement very similar to FIG. 6 but in FIG. 7 although the front wheels 71 are again driven through separate pumping devices 72 and 73 which are similar to that described in relation to FIGS. 2 and 3 and which are interconnected by a fluid connection 74, there is only a single drive 75 from the transfer gear box 220 to the devices 72 and 73, the drive splitting at 76 to drive both devices. The operation of the arrangement is substantially identical to that of FIG. 6.

Various modifications may be made to the invention as specifically described. Thus the front wheels could be the dominant wheels and the rear wheels driven through one or more pumping devices. The or each pumping device could be provided with a second valve member similar to the valve member 52 so as to provide a variable pumping resistance in reverse if this is desired.

It will be seen that the invention provides a simple four-wheel-drive arrangement having improved torque transmitting characteristics between the axles.

We claim:

1. A four-wheel-drive vehicle comprising drivable front and rear sets of wheels, the wheels of at least one set being connected by a differential gear; a prime mover; change speed means having an input and an output, the input being arranged to be driven by the prime mover and the output being connected by a first driving connection to drive the wheels of said one set; a two-part second driving connection between the wheels of said other set and either the first driving connection or said output, the parts of said second driving connection being drivingly connected respectively to the wheels of said other set and said output or first connection; a gear pumping device comprising first and second meshing gear means connected respectively to said parts of the second driving connection, relative rotation of said gear means resulting from a difference in the speed of rotation of said front and rear sets of wheels causing pumping of non-gaseous fluid; a circuit for the pump fluid; and variable orifice means in the circuit and operable by the pressure of the fluid being pumped to increase the resistance encountered by fluid being pumped around the circuit with increase in the speed of relative rotation between the first and second gear means whereby, as said difference in the speed of rotation of said front and rear wheels increases, an increasing proportion of the torque previously applied to said one set of wheels by said prime mover is applied to said other set of wheels.

2. A vehicle according to claim 1 wherein said first gear means comprises a first gear rotatable about an axis and to which one part of said second driving connection is connected and said second gear means comprises second gears meshing with the first gear and mounted on a carrier which itself rotates about said axis and to which the other part of said second driving connection is connected, relative rotation of the first gear and the carrier causing said non-gaseous fluid to be pumped by said gears.

3. A vehicle according to claim 1 including an anti-skid braking sensor connected to the second driving connection and to the vehicle brakes.

4. A vehicle according to claim 1 wherein the wheels of said other set are interconnected by a differential gear.

5. A vehicle according to claim 1 wherein the wheels of said other set are connected to the first driving connection or the output through separate gear pumping devices.

6. A vehicle according to claim 5 including two separate second driving connections from the output or the first driving connection to two gear pumping devices connected to the wheels of said other set.

7. A vehicle according to claim 5 wherein said separate gear pumping devices are driven from a common part of the second driving connection.

8. A vehicle according to claim 5 wherein there is a fluid connection between said separate gear pumping devices to equalise the pressure of the fluid therein.

* * * * *